United States Patent
Hoffman, II

(10) Patent No.: US 7,307,701 B2
(45) Date of Patent: Dec. 11, 2007

(54) METHOD AND APPARATUS FOR DETECTING A MOVING PROJECTILE

(75) Inventor: Richard G. Hoffman, II, Plano, TX (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/696,809

(22) Filed: Oct. 30, 2003

(65) Prior Publication Data

US 2005/0094134 A1    May 5, 2005

(51) Int. Cl.
*G01P 3/36*    (2006.01)
*G01C 3/08*    (2006.01)

(52) U.S. Cl. .................. 356/28.5; 356/28; 356/5.15

(58) Field of Classification Search .............. 356/4.01, 356/28, 28.5, 139.08, 139.05, 5.15; 359/203, 359/226
See application file for complete search history.

(56) References Cited

U.S. PATENT DOCUMENTS

| | | | | |
|---|---|---|---|---|
| 3,015,249 A | * | 1/1962 | Taylor ................. | 356/139.02 |
| 3,204,102 A | * | 8/1965 | Hand, Jr. ................ | 250/348 |
| 3,786,757 A | * | 1/1974 | Goldstein et al. .......... | 102/213 |
| 3,793,958 A | * | 2/1974 | Holt et al. ................ | 102/213 |
| 4,413,906 A | * | 11/1983 | Feldman et al. ........ | 356/139.01 |
| 4,861,158 A | | 8/1989 | Breen ............................ | 356/5 |
| 5,159,396 A | * | 10/1992 | Yuhas ....................... | 356/28.5 |
| 5,579,103 A | * | 11/1996 | Tachikawa .................. | 356/5.1 |
| 6,057,915 A | | 5/2000 | Squire et al. | |
| 6,084,552 A | * | 7/2000 | Robertson et al. .......... | 343/753 |
| 6,201,246 B1 | * | 3/2001 | Potekev et al. ............. | 250/353 |
| 6,559,932 B1 | | 5/2003 | Halmos ..................... | 356/5.03 |
| 6,844,924 B2 | * | 1/2005 | Ruff et al. .................. | 356/5.09 |
| 2003/0076415 A1 | * | 4/2003 | Strumolo .................... | 348/149 |
| 2003/0189512 A1 | * | 10/2003 | Chen et al. ................ | 342/160 |

FOREIGN PATENT DOCUMENTS

| | | | |
|---|---|---|---|
| DE | 31 48430 A1 | 6/1983 | |
| DE | 38 16050 A1 | 11/1989 | |
| GB | 2 219 708 A | * 12/1989 | ................. 342/159 |
| WO | WO 00/20880 | 4/2000 | |

OTHER PUBLICATIONS

European Patent Office Search Report; EP 04 25 5934; 3 pgs, Feb. 10, 2005.

* cited by examiner

*Primary Examiner*—Isam Alsomiri
(74) *Attorney, Agent, or Firm*—Baker Botts L.L.P.

(57) ABSTRACT

An apparatus includes a transmitter portion which transmits a defined beam of eyesafe laser energy, a receiver portion which receives reflected energy from the beam, and a further portion which analyzes information in the received energy so as to detect the presence of a moving projectile.

21 Claims, 3 Drawing Sheets

METHOD AND APPARATUS FOR DETECTING A MOVING PROJECTILE

TECHNICAL FIELD OF THE INVENTION

This invention relates in general to the detection of one or more moving projectiles and, more particularly, to a method and apparatus suitable for detecting one or more small projectiles, such as a bullet from a sniper rifle.

BACKGROUND OF THE INVENTION

There are military and other applications in which it is desirable to be able to detect one or more moving projectiles. Systems have previously been developed to detect one or more large projectiles, such as an artillery shell. However, it is more difficult to detect smaller projectiles, such as a sniper's bullet. Although existing systems have been generally adequate for their intended purposes, they have not been satisfactory in all respects, and none of them have proved to be suitably accurate and efficient at detecting just a single shot from a sniper rifle. Further, some of these systems routinely generate false alarms in response to irrelevant flashes and/or reflections, while others routinely generate false alarms in response to irrelevant acoustic effects. Still others are highly directional, which is problematic in situations where it is difficult to identify the particular direction from which hostile fire is coming.

SUMMARY OF THE INVENTION

From the foregoing, it may be appreciated that a need has arisen for an improved method and apparatus for detecting an incoming projectile. One form of the present invention involves: transmitting a defined beam of eyesafe laser energy; receiving reflected energy from the beam; and analyzing information in the received energy so as to detect the presence of a moving projectile.

BRIEF DESCRIPTION OF THE DRAWINGS

A better understanding of the present invention will be realized from the detailed description which follows, taken in conjunction with the accompanying drawings, in which.

DETAILED DESCRIPTION

Figure 1:
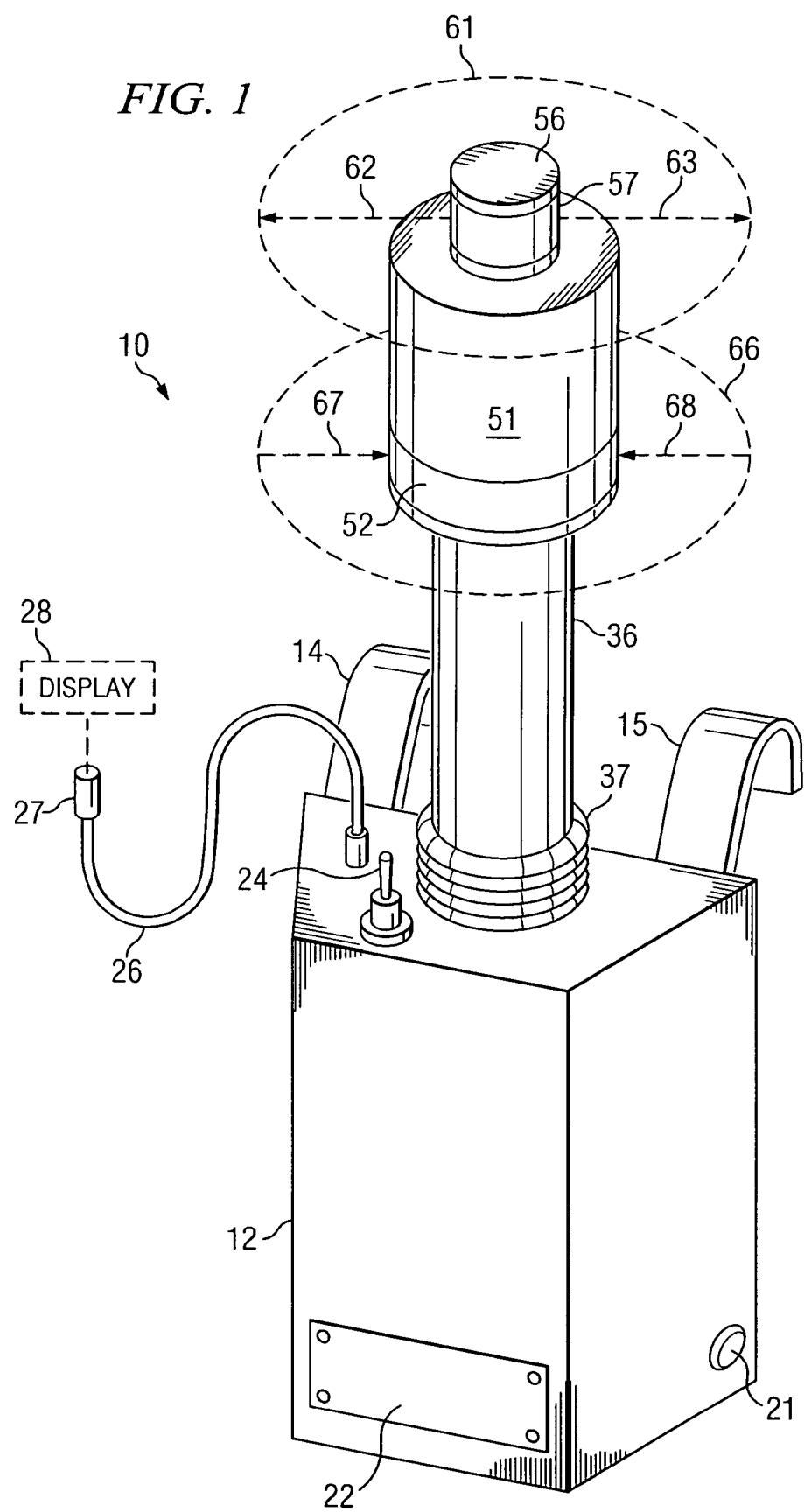
FIG. 1 is a diagrammatic perspective view of an apparatus which is a sniper detection system that embodies aspects of the present invention.

FIG. 1 is a diagrammatic perspective view of an apparatus which is a sniper detection system 10, and which embodies aspects of the present invention. The system 10 has a housing 12, and also has two curved shoulder supports 14 and 15 which are fixedly mounted on one side of the housing 12. A user can slip the shoulder supports 14 and 15 over his or her shoulders, in order to carry the system 10 somewhat like a backpack. The entire system 10 weighs about 50 to 60 pounds, due in part to the use of lightweight optics within the system.

Although the system 10 of FIG. 1 is configured to be a portable arrangement which can be carried like a backpack, this is merely one exemplary application for the invention, and the invention is not limited to this particular application. As one example of an alternative application, a system embodying the present invention could be mounted on a vehicle, rather than being carried like a backpack.

An on/off switch 21 is provided on the housing 12, and is coupled to an electronic circuit disposed within the housing 12. The housing 12 also has a cover 22 which is held in place by four screws. The cover 22 can be removed in order to permit replacement of a not-illustrated battery which is located within the housing 12, and which powers the electronic circuit.

A global positioning system (GPS) antenna 24 is mounted on top of the housing 12, and is coupled to the electronic circuit within the housing 12. Using information in electromagnetic signals received from GPS satellites through the antenna 24, the system 10 can determine in a known manner its precise location on the surface of the earth, to an accuracy of a few feet.

A flexible electrical cable 26 has one end coupled to the electronic circuit within the housing 12, and has a connector 27 at its other end. The connector 27 can be used to couple the cable 27 to a display 28, or to some other type of electronic device. The display 28 is described in more detail later.

A cylindrical post 36 projects upwardly from the top of the housing 12, and also projects downwardly into the housing 12 through a not-illustrated opening in the top wall of the housing 12. The post 36 is pivotally supported with respect to the top wall of the housing 12 by a not-illustrated gimbal of a known type, and the gimbal is surrounded by a flexible bellows seal 37. A not-illustrated weight is secured to the lower end of the post 36 within the housing 12, and in the disclosed embodiment is the not-illustrated battery. Thus, when a person wearing the system 10 is walking or otherwise moving in a manner that causes movement of the housing 12, gravity will cause the post 36 to remain substantially vertical and stable at all times, despite the movement of the housing 12.

A cylindrical housing 51 is fixedly and concentrically mounted at the top of the post 36, and has a diameter larger than the diameter of the post 36. The lower portion of the housing 51 has a 360° window 52. A further cylindrical housing 56 is fixedly and concentrically mounted on top of the housing 51, and has a diameter smaller than the diameters of the post 36 and the housing 51. The housing 56 has a 360° window 57. The 360° windows 52 and 57 are each transmissive to radiation with a wavelength in a range corresponding to laser energy of a type commonly referred to as "eyesafe" laser energy.

As described in more detail later, the system 10 emits through the 360° window 57 a beam of eyesafe laser energy which simultaneously travels outwardly in all azimuth directions, as indicated diagrammatically in FIG. 1 by the broken line circle 61 and by the arrows 62 and 63. This transmitted energy has an azimuth angle of 360°, and has an elevation angle in all directions of approximately 10°. However, it will be recognized that either of these angles could be different.

After transmitting a beam of laser energy, the system 10 simultaneously looks in all directions for reflections of the transmitted laser energy, as indicated diagrammatically in FIG. 1 by the broken line circle 66, and the arrows 67 and 68. Any such reflected energy enters the system through the 360° window 52. If a not-illustrated projectile such as a bullet is fired approximately toward a person wearing the apparatus 10, the projectile will reflect a portion of the laser energy transmitted at 61, and this reflected energy will enter the system 10 through the 360° window 52.

Figure 2:
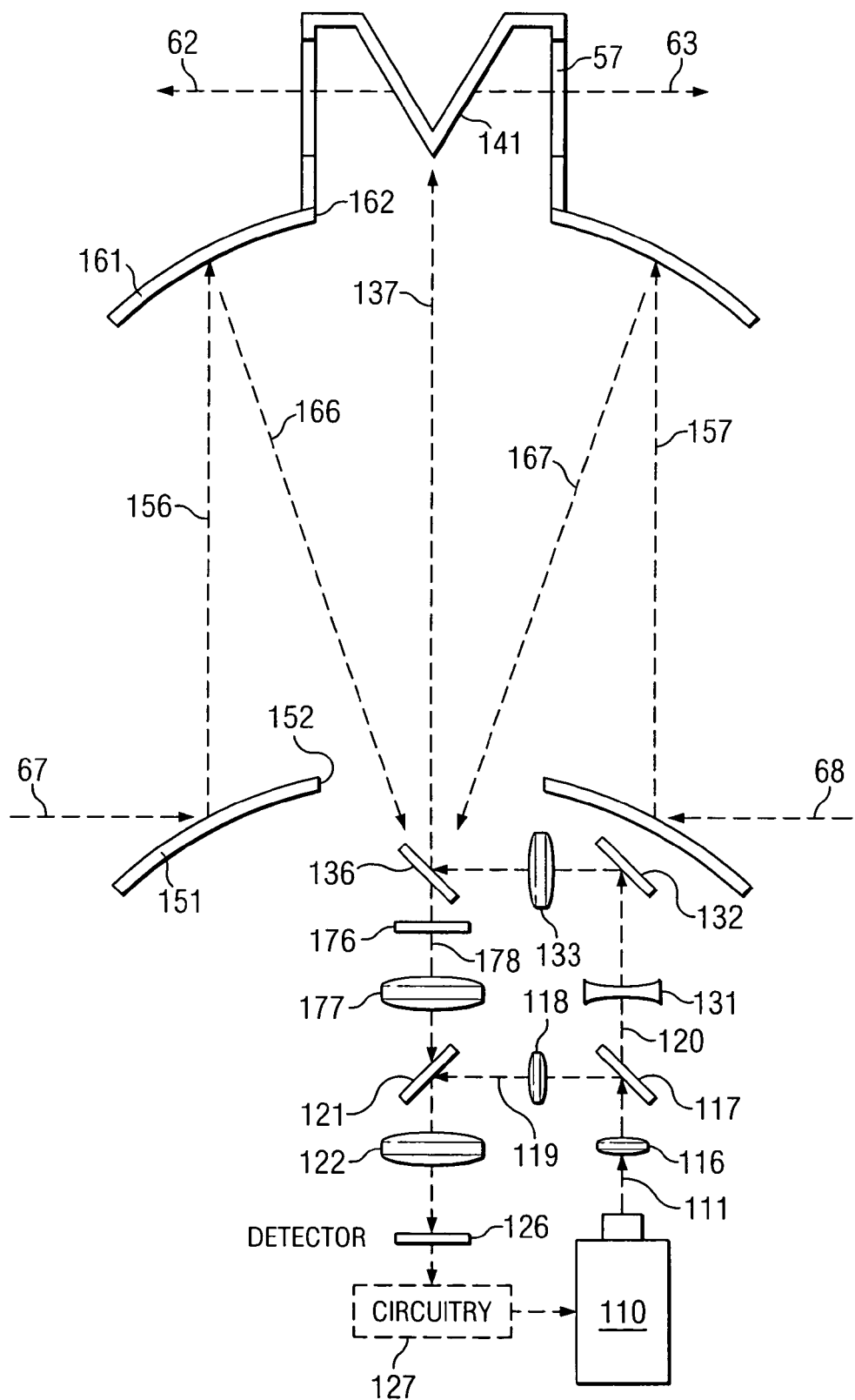
FIG. 2 is a block diagram of an optical arrangement which is part of the system of FIG. 1.

FIG. 2 is a block diagram of an optical arrangement which is provided within the system 10 of FIG. 1, and which in particular is part of the pivotally supported assembly that includes the post 36. The optical arrangement includes a laser 110 of a known type, which transmits a beam 111 of radiation. In the embodiment of FIG. 1, this beam 111 is a continuous wave (CW) laser beam, which is modulated with a single frequency. The beam 111 is configured to present a minimal risk of injury to a human eye, and is thus laser energy of a type commonly referred to as eyesafe laser energy.

The beam 111 passes upwardly through a lens 116. The lens 116 cooperates with a not-illustrated lens disposed within the laser 110 so as to expand the laser beam. The expanded beam then travels to a beam splitter 117. Most of the energy of the beam 111 continues traveling upwardly through the beam splitter 117, as indicated at 120. However, a very small portion of the energy of the beam 111 is reflected by the beam splitter 117 in order to serve as a reference beam 119, which passes through a lens 118 to a further beam splitter 121. The reference beam 119 is reflected by the beam splitter 121, and passes through a lens 122 to a radiation detector 126.

The detector 126 is a device of a known type, which has a two-dimensional array of detector elements that can each detect radiation having a wavelength in a range of interest. Each of these detector elements produces a respective output signal, which is supplied to the electronic circuitry 127 of the system 10. The circuitry 127 also controls the laser 110.

Referring again to the beam splitter 117, and as mentioned above, most of the energy of the laser beam 111 passes upwardly through the beam splitter 117, as indicated at 120. This beam of energy 120 then passes upwardly through a lens 131, and is reflected by a mirror 132. It then passes through a lens 133 and travels to a beam splitter 136, where it is reflected upwardly as indicated at 137. The beam of energy 137 has its cross-sectional area approximately centered on the point of an approximately conical mirror or reflector 141. Thus, the energy of the beam 137 is reflected substantially uniformly in all directions, and passes through the window 57 with an azimuth angle of 360° and an elevational angle of approximately 10°. This is indicated diagrammatically at 61 in FIG. 1, and at 62 and 63 in FIGS. 1 and 2.

The optical arrangement of FIG. 2 includes an annular convex mirror 151 with a central opening 152. As discussed above in association with FIG. 1, reflected energy from the transmitted beam, including energy reflected by a moving projectile, can be received from any direction within a field of regard which has an azimuth angle of 360°, and an azimuth angle of approximately 10°, as indicated diagrammatically at 66 in FIG. 1, and at 67-68 in FIGS. 1 and 2. Reflected laser energy which arrives from any direction, for example as indicated at 67 and 68, passes through the 360° window 57 (FIG. 1), and is reflected by the annular mirror 151 and travels upwardly, as indicated diagrammatically at 156 and 157.

The optical arrangement of FIG. 2 also includes an annular concave mirror 161, which is disposed above the mirror 151, and which has a central opening 162. The transmitted laser beam 137 passes upwardly through the central openings in the mirrors 161 and 161 as it travels from the beam splitter 136 to the conical mirror 141. Incoming radiation reflected by the mirror 151, such as that at 156 and 157, is reflected by the mirror 161, and then travels approximately downwardly toward the beam splitter 136, as indicated diagrammatically at 166 and 167. Consequently, the incoming radiation from all directions passes downwardly through the beam splitter 136 and forms a combined beam 178. The combined beam 178 passes through two lenses 176 and 177 to the beam splitter 121. This beam 178 then continues downwardly through the beam splitter 121 and through the lens 122 to the detector 126. Each detector element of the detector 126 effectively receives reflected radiation coming from a respective different direction external to the system 10.

Figure 3:
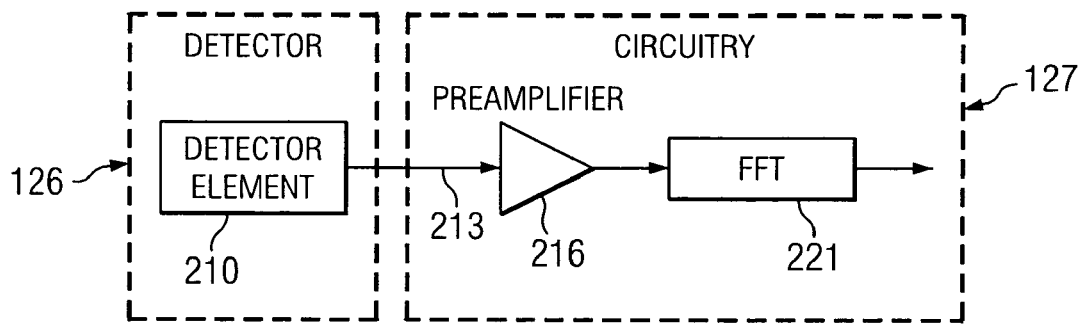
FIG. 3 is a block diagram showing selected components from a circuit which is part of the system of FIG. 1.

FIG. 3 is a block diagram which shows one detector element 210 from the detector 126 of FIG. 2, and selected components from the electronic circuit 127. As discussed above, the detector element 210 receives the incoming reflected laser energy from a respective unique direction, and also receives a respective portion of the energy of the reference beam 119, which was split at 117 from the main beam 111 of the laser 110. The received and reference signals undergo mixing within the detector element 210, in a manner which produces sum and difference frequencies. The result is an intermediate frequency (IF) output 213 from the detector element 210, and this IF output is supplied to a preamplifier 216 in the circuitry 127 of FIG. 2.

The output of the preamplifier 216 is supplied to the input of a circuit 221, which carries out a fast Fourier transformation (FFT) calculation. This permits detection of the Doppler shift between the energy which was transmitted and the energy which was received from a particular direction. Where the system detects an appropriate Doppler shift, it will interpret this to mean that there is an incoming projectile from the respective direction monitored by the particular detector element 210. In this manner, the system 10 is able to detect the presence of an incoming projectile, as well as the particular direction from which it is coming. Although the circuit 221 in FIG. 3 uses a FFT calculation to detect a Doppler shift, there are a variety of other techniques which can be used to detect a Doppler shift, such as appropriate filtering techniques.

As discussed above in association with FIG. 1, the system 10 has a GPS antenna 24, which allows the system 10 to make a very precise determination of its current location on the surface of the earth. When the system 10 detects an incoming projectile, the system 10 can determine the direction and range to the location of the origin of the projectile, such as a sniper. Based on information such as the GPS data regarding the location of the system 10, standard topographical map information, and the detected direction and range to the origin of the projectile, the system 10 can calculate other information regarding the origin of the projectile, such as altitude, longitude and latitude.

As discussed above, the laser 110 in the embodiment of FIGS. 1-3 uses a type of modulation in which a single frequency is superimposed on a continuous wave (CW) laser beam. An alternative approach, which can detect a projectile at a greater range, is to use a pulsed laser with a fast pulse rate. This also permits detection of the time of flight to objects, which permits the determination of the range to a projectile. As one example, the laser could have a wavelength of approximately 1.55 microns, a duration or pulse width less than approximately 20 nanoseconds, and a peak power of no more than about 5 megawatts. If the pulse rate is fast enough, the velocity of an incoming projectile can be detected by the rate of change of the range. This approach has the advantage of rapidly giving an estimate of range, velocity and position. However, it involves a high processing load, and is more susceptible to clutter than the single frequency approach, due to the fact that range information from all directions is being processed.

Yet another alternative approach is to use a transmitted beam with chirp modulation for range determination, and possibly with a second transmitted beam to serve as a Doppler-generating component. In order to provide both the beam for chirp modulation and the beam for Doppler-generation, it would be possible to use a simultaneous two-color laser transmitter with separate modulators for each wavelength. This approach can provide rapid identification of the direction to an incoming projectile, along with the range information which is needed for time of flight calculation. This approach involves some increased complexity over the single frequency modulation approach.

With respect to range detection, the performance of the system 10 will vary somewhat with the size of the projectile being detected. For example, a 50 caliber projectile can be detected to a range of at least 250 meters, a 7.62 mm projectile can be detected to a range of at least 200 meters, and a 5.56 mm projectile can be detected to a range of at least 175 meters.

Figure 4:
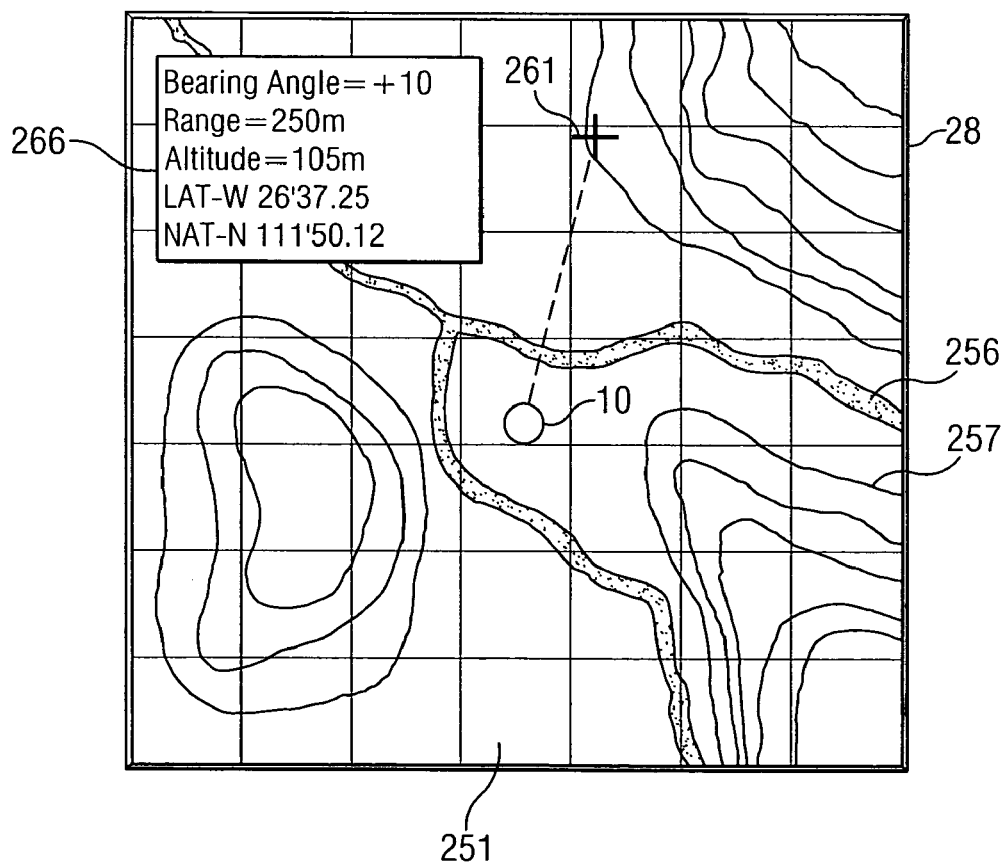
FIG. 4 is a diagrammatic view showing in more detail a display which is a component of the system of FIG. 1.

FIG. 4 is a diagrammatic view showing in more detail the display 28 of FIG. 1. The display 28 has a liquid crystal display (LCD) screen 251. As discussed above, the GPS antenna 24 allows the system 10 to make a very precise determination of its current location on the surface of the earth. As a result, the system 10 can display on the screen 251 a map of the terrain currently surrounding the system 10, such as a river 256 and topographical contours 257. Further, and also based on the GPS information, the system 10 superimposes on the map an icon representing itself, at a location approximately in the center of the screen 251. This icon is coordinated with the map information, so that the location of the icon on the map corresponds to the actual location of the system 10 in the real-world terrain.

When the system 10 detects an incoming projectile, the system 10 can determine the direction and range to the location of the origin of the projectile, such as a sniper, and can display this location on the screen 251, for example as indicated by the symbol "+" at 261 in FIG. 4. The system can also display at 266 a window containing selected information about the origin of the projectile in alphanumeric form, such as the bearing angle and range to the origin of the projectile, and other relevant information such as a calculated altitude, latitude and longitude of the origin of the projectile. In addition to the visible information presented on the screen 251, the system 10 can provide other types of information, such as an audible warning whenever a projectile is detected.

Although FIG. 1 shows that the connector 27 of the cable 26 is coupled to the display 28, it would alternatively be possible to couple the connector 27 to a guidance system for a GPS-guided missile. This would permit the guidance system to use information such as that displayed on the display 28 in FIG. 4 for the purpose of guiding a missile to the detected origin of the projectile. Moreover, several of the systems 10 could be positioned at different locations on a battlefield, and could each detect the same projectile from different angles. These systems 10 could all be coupled to the missile guidance system, for example through a battlefield communication network, so that the guidance system could combine information from two or more of the systems 10 to obtain even more accurate information regarding the origin of the projectile, for example by performing triangulation in order to accurately determine the position of the origin of the projectile.

The present invention provides a number of advantages. One such advantage is that the disclosed system can efficiently detect gunfire directed at friendly forces. In this regard, the system can efficiently and accurately detect a single small projectile such as a sniper bullet, which is much more difficult to detect than a large artillery shell. In order to provide a basis for selecting an appropriate countermeasure, the system can provide information such as the direction, speed and range of the projectile.

A further advantage is that the system provides continuous 360° coverage, and is relatively immune to irrelevant flashes and reflections, as well as irrelevant acoustic effects. Further, the system can efficiently detect a projectile in a manner which maximizes the amount of time available for countermeasures or defensive action.

Although one embodiment has been illustrated and described in detail, it will be recognized that substitutions and alterations are possible without departing from the spirit and scope of the present invention, as defined by the following claims.

What is claimed is:

1. A method comprising:
   pivotally coupling a housing to a post;
   transmitting a defined beam of eyesafe laser energy by a window disposed on an upper end of the post, said beam having an azimuth angle of 360°;
   receiving reflected energy from said beam onto a detector stored in the housing, the detector having a two-dimensional array of detector elements and, in response, forming a two-dimensional image representing a contiguous 360° azimuthal view on the detector;
   analyzing information in said received energy by an electronic circuit contained in the housing so as to detect the presence of a moving projectile; and
   tilting, using a weight disposed on a lower end of the post, the post relative to the housing such that angular movement of the housing allows the beam to remain in a generally horizontal orientation.

2. A method according to claim 1, including configuring said beam to have an elevation angle.

3. A method according to claim 2, including selecting said elevation angle to be approximately 10°.

4. A method according to claim 1, wherein said analyzing includes detecting a Doppler shift in said received energy.

5. A method according to claim 4, wherein said receiving includes directing onto said detector a reference beam, so that energy from said defined beam mixes with energy from said reference beam in each said detector element to produce sum and difference frequencies.

6. A method according to claim 1, wherein said analyzing includes supplying an output signal from each said detector element to a plurality of circuit portions which each perform at least one of filtering and fast Fourier transformation.

7. A method according to claim 6, wherein said transmitting includes configuring said defined beam to include chirp modulation.

8. A method according to claim 6, wherein said transmitting includes configuring said defined beam to be modulated with a single frequency.

9. A method according to claim 6, including selecting said reference beam to be substantially equivalent to said defined beam.

10. An apparatus comprising:
    a gimbal that pivotally couples a housing to a post having an upper end and a lower end, the lower end being coupled to a weight;

a transmitter portion which transmits a defined beam of eyesafe laser energy through a window disposed on the upper end of the post, said beam having an azimuth angle of 360°;

a receiver portion which receives reflected energy from said beam onto a detector stored in the housing, the detector having a two-dimensional array of detector elements and, in response, forming a two-dimensional image representing a contiguous 360° azimuthal view on the detector; and a further portion which analyzes information in said received energy by an electronic circuit contained in the housing so as to detect the presence of a moving projectile.

11. An apparatus according to claim 10, wherein said beam has an elevation angle.

12. An apparatus according to claim 11, wherein said elevation angle is approximately 10°.

13. An apparatus according to claim 10, wherein said further portion includes circuitry which can detect a Doppler shift in said received energy.

14. An apparatus according to claim 13, wherein said receiver includes structure for directing onto said detector a reference beam, energy from said defined beam mixing with energy from said reference beam in each said detector element to produce sum and difference frequencies.

15. An apparatus according to claim 10, wherein said circuitry includes a plurality of circuit portions which each perform at least one of filtering and fast Fourier transformation of an output signal from one of said detector elements.

16. An apparatus according to claim 15, wherein said defined beam includes chirp modulation.

17. An apparatus according to claim 15, wherein said defined beam is modulated with a single frequency.

18. An apparatus according to claim 15, wherein said reference beam is substantially equivalent to said defined beam.

19. A method comprising:
pivotally coupling a housing to a post;
transmitting a defined beam of eyesafe laser energy by a window disposed on an upper end of the post, said beam having an azimuth angle of 360°;
receiving reflected energy from said beam onto a detector stored in the housing, the detector having a two-dimensional array of detector elements and, in response, forming a two-dimensional image representing a contiguous 360° azimuthal view on the detector;
detecting the presence of a moving projectile by detecting a Doppler shift in said received energy by an electronic circuit contained in the housing; and
tilting, using a weight disposed on a lower end of the post, the post relative to the housing such that angular movement of the housing allows the beam to remain in a generally horizontal orientation.

20. A method comprising:
pivotally coupling a housing to a post;
transmitting a defined beam of eyesafe laser energy by a window disposed on an upper end of the post throughout a predetermined beam azimuth angle;
receiving reflected energy from said beam onto a detector in the housing, the detector having a two-dimensional array of detector elements and, in response, forming a two-dimensional image representing a contiguous field of regard on the detector;
analyzing information in said received energy by an electronic circuit contained in the housing simultaneously throughout the field of regard so as to detect the presence of a moving projectile; and
tilting, using a weight disposed on a lower end of the post, the post relative to the housing such that angular movement of the housing allows the beam to remain in a generally horizontal orientation;
wherein the field of regard defines a contiguous azimuthal extent that is to be analyzed for the presence of a moving projectile and wherein the beam azimuth angle is substantially equivalent to the field of regard.

21. An apparatus comprising:
a gimbal that pivotally couples a housing to a post having an upper end and a lower end, the lower end being coupled to a weight;
a transmitter portion that transmits a defined beam of eyesafe laser energy through a window disposed on the upper end of the post, said beam having a beam azimuth angle;
a receiver portion that receives reflected energy from said beam onto a detector stored in the housing, the detector having a two-dimensional array of detector elements and, in response, forming a two-dimensional image representing a contiguous field of regard on the detector simultaneously throughout the field of regard; and
a further portion that analyzes information in said received energy by an electronic circuit contained in the housing so as to detect the presence of a moving projectile;
wherein the field of regard defines a contiguous azimuthal extent that is to be analyzed and wherein the beam azimuth angle is substantially equivalent to the field of regard.

* * * * *